Nov. 18, 1969    K. V. ANDERSON    3,479,116
FILM VIEWER
Filed July 14, 1967    5 Sheets-Sheet 5
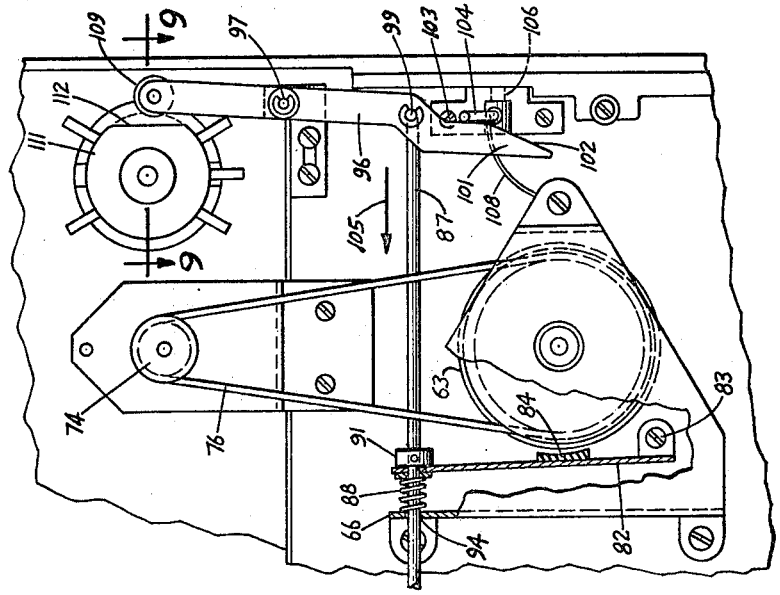
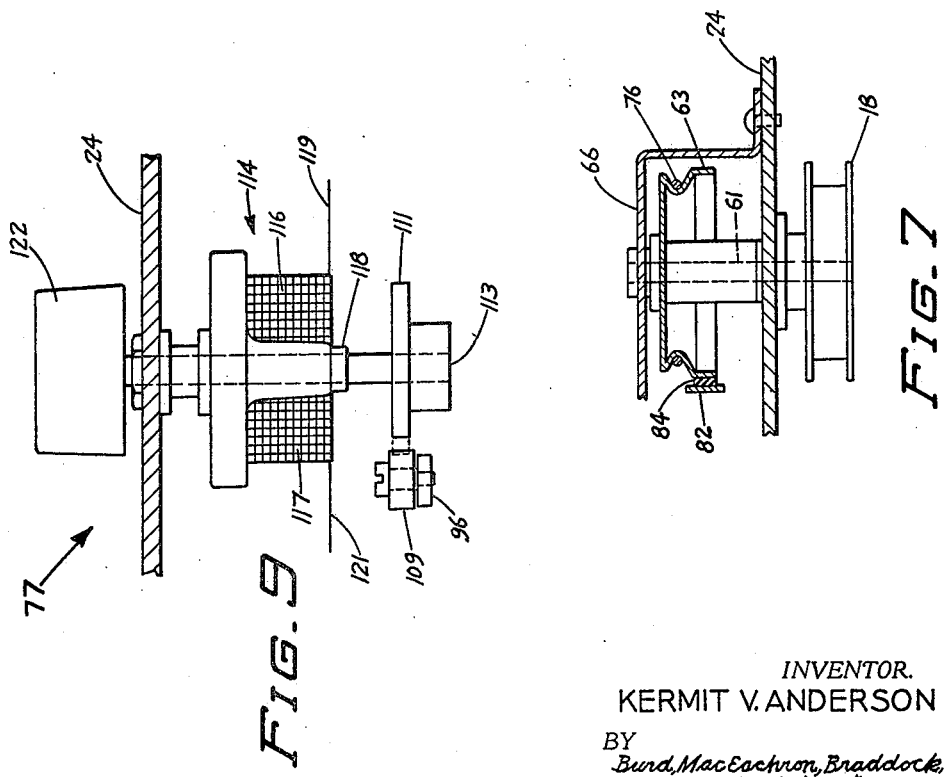
INVENTOR.
KERMIT V. ANDERSON
BY
Burd, MacEachron, Braddock,
Bartz & Schwartz
ATTORNEYS 3,479,116
FILM VIEWER
Kermit V. Anderson, Delano, Minn., assignor to Washington Scientific Industries, Inc., Minnetonka, Minn., a corporation of Minnesota
Filed July 14, 1967, Ser. No. 653,435
Int. Cl. G03b 21/28, 21/00
U.S. Cl. 353—77   13 Claims

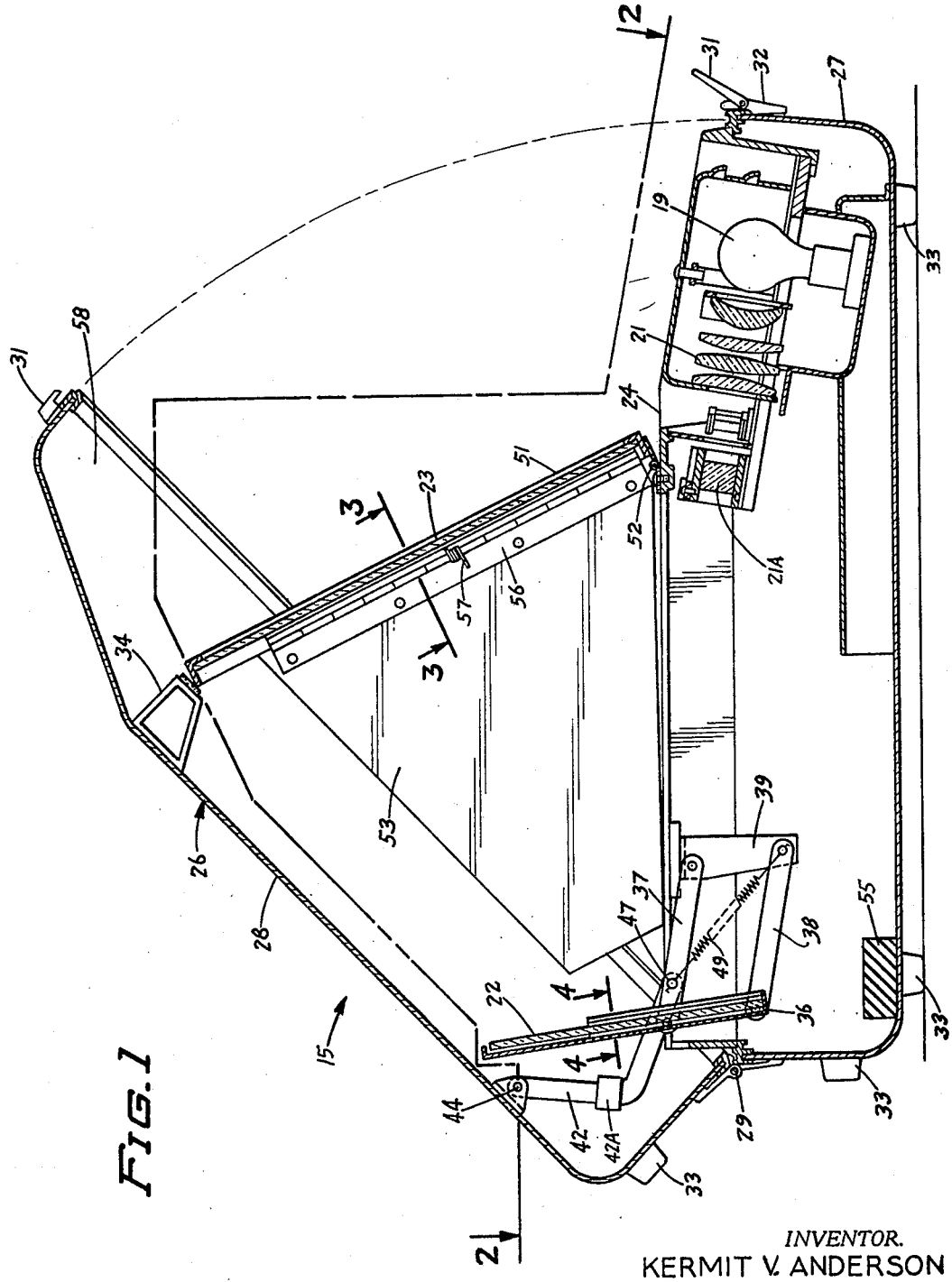

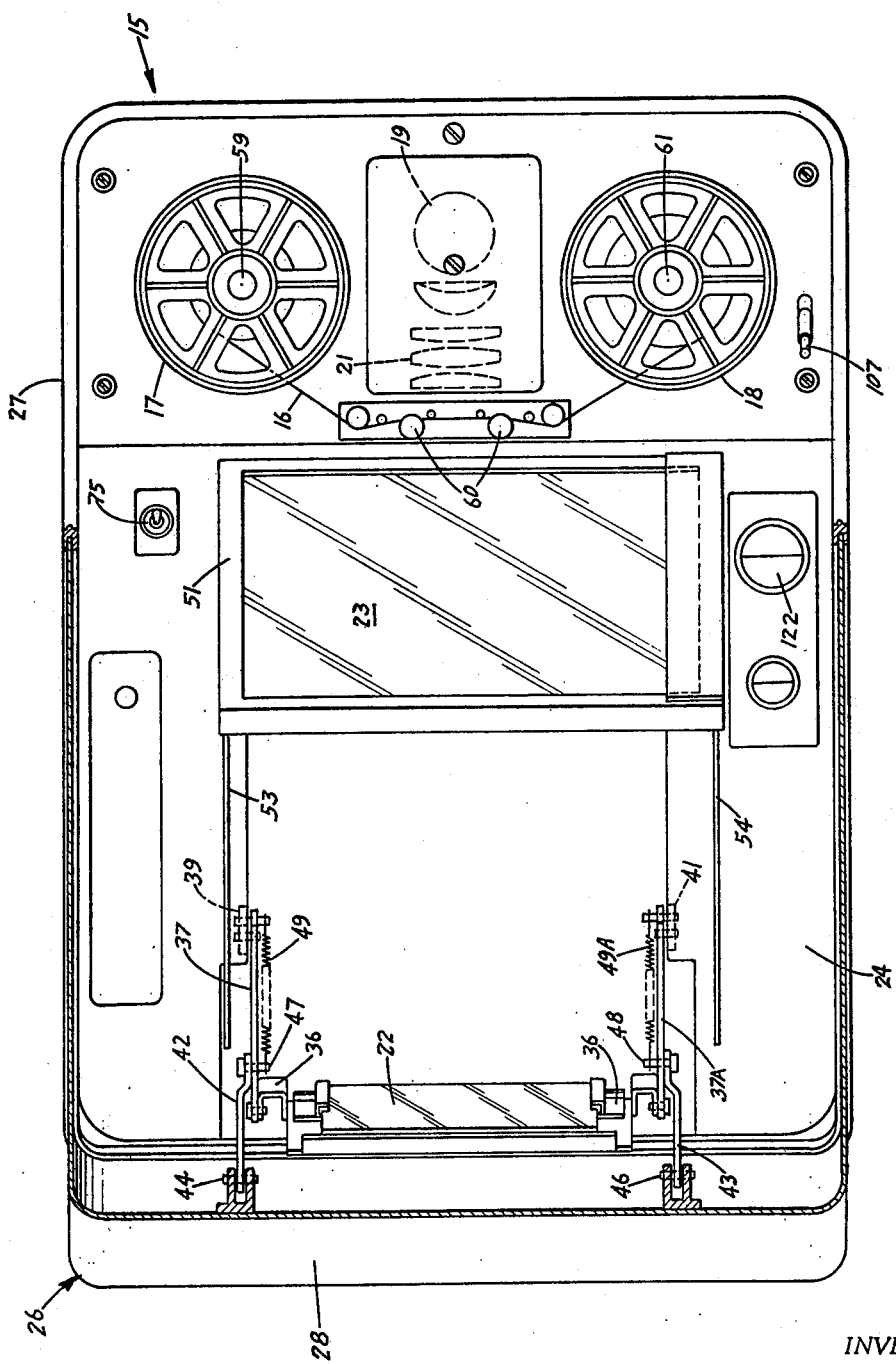

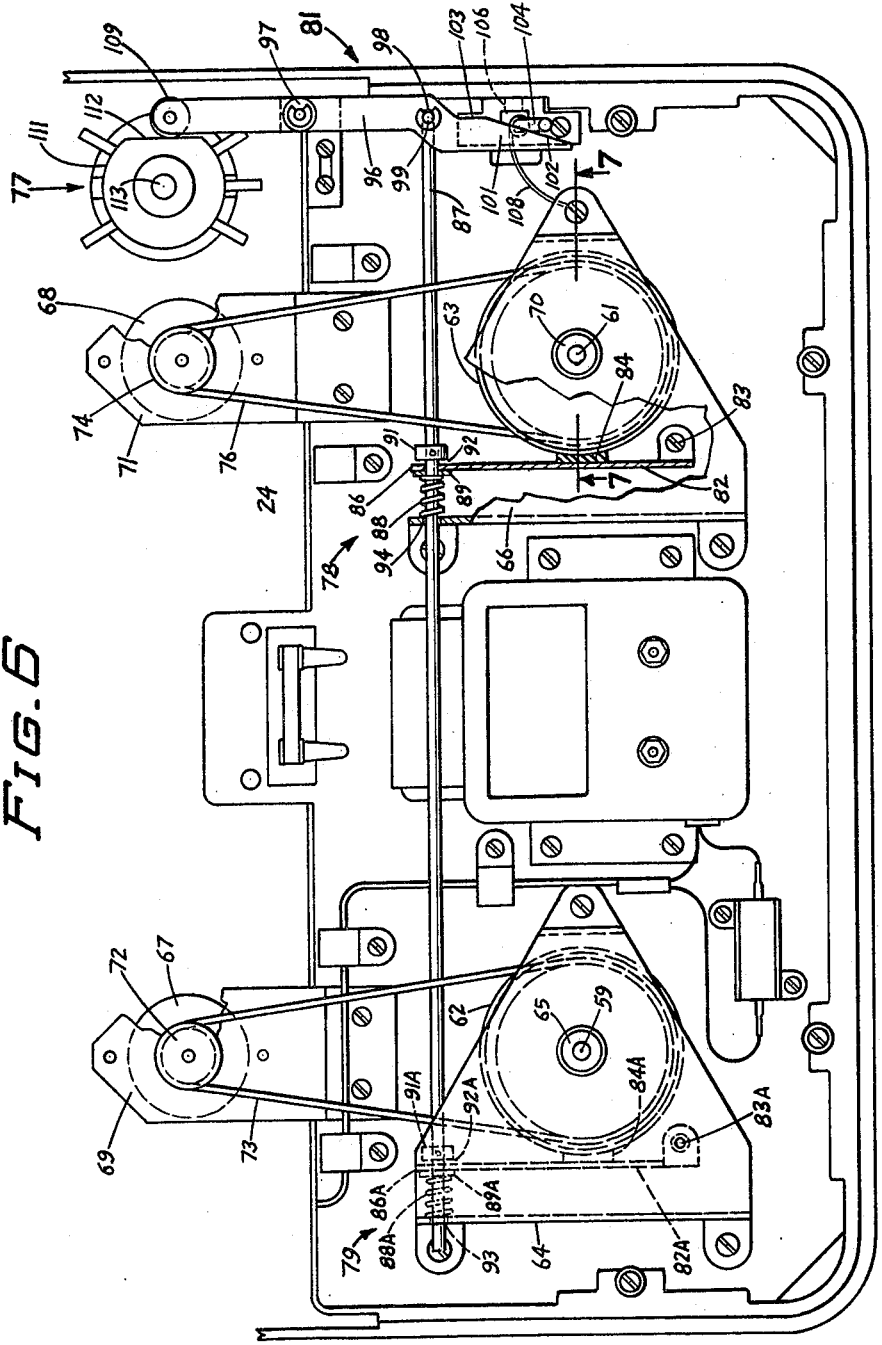

ABSTRACT OF THE DISCLOSURE

A portable film reader having a light source directing light through a lens system and film onto a mirror used to reflect the light onto a rear projection screen. The reader is mounted on a frame located in the bottom of a carrying case. Parallel linkage connect the mirror with the cover of the carrying case so that the mirror moves up and down with the cover. The screen pivotally attached to the frame has folding side shields which cooperate with the cover to enclose the space between the mirror and screen eliminating outside light on the rear of the screen. The cover projects forward from the screen to function as a light visor. In the storage position the screen and side shields fold down adjacent the frame and the mirror moves down into the case with the closing of the cover. Spring applied cam release brakes are used to simultaneously brake the spindles carrying the film reels. A common control rod carries separate springs to apply pivoted brake levers. A lever pivoted on the frame and connected to the control rod is selectively moved by a cam and finger to release the brakes. The cam is connected to a dual switch operable to selectively control motors for driving the spindles.

SUMMARY OF THE INVENTION

The film viewer or reader of the invention is a portable projector and rear screen combination that folds into a compact carrying case. The screen cooperates with the cover of the case to reduce the amount of outside light on the screen. Side walls pivotally mounted on opposite sides of the screen adjacent the sides of the cover also minimize the outside side light on the screen.

A mirror attached to a frame and the cover by a linkage reflects the light from the projector onto the back of the screen. The linkage causes the mirror to move with the cover thereby eliminating set up and adjustment of the mirror. The parts of the viewer are not disassembled to convert the viewer into its storage position. The screen and side walls fold into a generally flat position adjacent the frame allowing the cover to be moved to the closed position.

In the drawings

FIGURE 1 is a side elevational view in section of the film reader of the invention with the projection screen in the viewing position;

FIGURE 2 is a sectional view taken along the line 2—2 of FIGURE 1;

FIGURE 3 is a sectional view taken along the line 3—3 of FIGURE 1;

FIGURE 4 is a sectional view taken along the line 4—4 of FIGURE 1;

FIGURE 5 is a view similar to FIGURE 1 showing the projection screen folded and the cover closed;

FIGURE 6 is a bottom plan view of the drive and brake system for the film reels;

FIGURE 7 is a sectional view taken along the line 7—7 of FIGURE 6;

FIGURE 8 is a partial plan view of the drive and brake system showing the brake in the release position; and FIGURE 9 is an enlarged sectional view taken along line 9—9 of FIGURE 8.

Referring to the drawings, there is shown in FIGURES 1 and 2 the film reader of the invention indicated generally at 15. As shown in FIGURE 2, reader 15 is designed for strip or tape film 16 carried on reels 17 and 18. A light source 19 projected through a light condensing system 21 and lens system 21A directs the image on the film to a mirror 22 which reflects the image onto a rear projection screen 23. Preferably, the screen is lumenized, non-glare and tinted rear projection screen. Broadly, reader 15 is a combination projector and viewing screen.

The projection screen and mirror are carried on a frame 24 located in a carrying case indicated generally at 26. The midsection of frame 24 has a rectangular opening for the mirror and provides space between the mirror and the lens system for the light beam. The case is designed to fold into a luggage style carrying case to enhance the portability of the reader. Case 26 has a pan-shaped base 27 with a flat bottom wall and upright side walls carrying frame 24. Located over base 27 is an inverted pan-shaped cover 28. Hinges 29, located along the back of the base and cover, pivotally connect the cover to the base. Cooperating latches 31 secured to the front of the cover and the base are used to lock the case as shown in FIGURE 5. A handle 32 attached to the front of base 27 facilitates the carrying of the case. Short legs or cushion members 33 are secured to the bottom and back of the base 27 and the back of cover 28 to stabilize the reader on a supporting surface.

As shown in FIGURES 1 and 2, cover 28 is held in an open position by the projection screen 23 which extends in an upwardly and rearwardly direction. Mirror 22 is in alignment with lens system 21A so that the light image is reflected by the mirror onto the projection screen 23. When cover 28 is in the open position, a stop 34 secured to the inside of the cover engages the top of the projection screen 23 holding the cover in a fixed position and stabilizes the projection screen.

As shown in FIGURES 1, 2, 4 and 5, mirror 22 is held in a frame 36 positioning the mirror in the rear area of the case in a generally upright position. Two pairs of forwardly extended parallel links 37 and 38 and 37A and 38B mount the mirror 22 on a pair of downwardly extended legs 39 and 41 secured to frame 24. A pair of links are located on opposite sides of the mirror with the rear portions of each link pivotally connected to frame 36 and the forward portions of each link pivotally connected to legs 39 and 41 respectively. The mirror 22 moves between an operative viewing position, shown in FIGURE 1, and a storage position, shown in FIGURE 5. Movement of mirror 22 is concurrent with and in response to the opening and closing of cover 28. Cover 28 dictates the position of mirror 22. This concurrent movement is achieved through the use of a pair of angularly shaped arms 42 and 43. The lower ends of the arms 42 and 43 are pivotally connected to intermediate portions of the top links 37 and 37A by pivots 47 and 48. The upper ends of each of the arms are connected through pivotal connections 46 and 47 to the cover 28, so that on angular movement of cover 28, parallel links 37 and 38 and 37A and 38A directly moving the mirror in generally up and down directions. Springs 49 and 49A connected to the pivots 47 and 48 and the lower pivots of arms 39 and 41 bias mirror 22 in a downward direction.

Referring to FIGURES 1, 2 and 3, projection screen 23 is surrounded with a peripheral frame 51 used to mount the screen on frame 24. An elongated transverse hinge 52 secures the bottom of frame 51 to the main frame 24 permitting the swinging of frame 51 and projection screen 23 to an upright viewing position shown in FIGURE 1 and to a flat folded storage position shown in FIGURE 5.

To insure maximum light intensity and an even viewing image on screen 23, the sides of the screen as well as the space between the screen and mirror 22 is shielded with upright side walls 53 and 54 pivotally attached to opposite sides of frame 51 by upright hinges 56. Hinges 56 permit the side walls 53 and 54 to be folded into overlapped positions as shown in FIGURES 3 and 5. This allows both the side walls and the screen and frame to be moved to the folded storage position. A pair of torsion springs 57 cooperate with the hinge to bias the side walls to their extended positions. The springs also facilitate the opening as well as holding the side walls in their upright and rearwardly projected positions. Referring to FIGURE 1, there is shown the side wall 53 having a general rectangular shape and extending upwardly above the bottom edge of cover 28 with the bottom of the side wall resting on frame 24. With the side wall in this position the side light is eliminated. In addition, the side walls 53 and 54 function as supports for retaining the projection screen 23 in the upright read position. To reduce the intensity of the outside light and the glare on the front of the projection screen 23 cover 28 has a forward extension or visor 58 above and projected forwardly from the screen. The cover 28 in combination with the side walls is a light shield for both the front and back sides of the projection screen 23 providing maximum image intensity as well as uniform light intensity over the entire screen.

In use, reader 15 being portable is easily set up on a desk or a table making visual data immediately available where and when it is needed. The light emanating from light source 19 is directed through the light condensing system 21 and film 16 then through lens 21A reflecting the image off mirror 22 onto the rear projection screen 23. Mirror 22 is held in position by cover 28 resting on the top of screen frame 51. Arms 42 and 43 pivotally attached to the cover directly move the parallel linkages supporting the mirror 22 with the movement of the cover so that the position of the mirror is dependent on the position of the cover. Separate adjustments and separate setting up of the mirror is not necessary to condition the reader for viewing.

On movement of projection screen 23 to its upright read position, as shown in FIGURE 1, the side walls 53 and 54 are moved outwardly to their rearwardly extended positions. The side wall in conjunction with the cover shields the back or rear side of the screen from outside light. The inside of cover 28 and the side walls 53 and 54 are dull black so that there is a minimum of reflected light to interfer with the image on screen 23.

Reader 15 is quickly converted to its storage position, shown in FIGURE 5, by moving cover 28 upwardly to release stop 34 from the top of screen frame 51. Side walls 53 and 54 are then folded over each other adjacent the inside surface of screen 23 so that both the side walls and the screen can be pivoted downwardly agains the top of frame 24. The cover is then free to move to the closed position automatically carrying mirror 22 to the down position into engagement with mirror support block 55. Bumpers 42A on arms 42 engage screen frame 51 holding the screen against frame 24.

From the foregoing description it is readily apparent that the reader is a compact and portable machine that is quickly set up for reading data from films such as a taped film.

Referring to FIGURE 2, reels 17 and 18 are mounted on upright rotatable spindles 59 and 61 located on opposite sides of the light condensing system 21. The portion of the film 16 between the reels is threaded through a film guide system 60 positioning the tape in alignment with the lens system 21A. Spindles 59 and 61 are mounted in bearings (not shown) carried on frame 24.

As shown in FIGURE 6, the lower ends of spindles 59 and 61 are secured to pulleys 62 and 63 respectively. A support 64 extends over pulley 62 and has a bearing 65 accommodating the lower end of spindle 59. A similar support 66 extends over pulley 63. A bearing 70 is mounted in support 66 rotatably mounts the lower end of spindle 61. Small electric DC motors 67 and 68 mounted on brackets 69 and 71 respectively are selectively operable to drive pulleys 62 and 63. Motor 67 has a drive pulley 72 connected by a belt 73 to the spindle pulley 62. In a similar manner, motor 68 has a drive pulley 74 connected by a belt 76 to the spindle pulley 63.

The motors 67 and 68 are selectively connected to a source of power by combination of brake and switch assembly indicated generally at 77. The assembly 77 has a pair of variable resistance switches and a single movable contact so that only one of the switches can be actuated at one time whereby only one of the motors is operating at one time to move that film in a forward or rearward direction. Operation of the other motor will move the film in the opposite direction. The motors 67 and 68 are small direct current motors enabling the spindles to be operated at varying speeds through the use of variable resistor switches. The reader being a portable machine including a transformer (not shown) enabling the reader to be connected to the conventional AC source of power. An on-off switch 75 shown in FIGURE 2 is located in the electrical circuit for the reader.

The on and off positions of the switches of assembly 77 is coordinated with the operation of a pair of brakes 78 and 79 for the spindles 61 and 59 respectively. A common control mechanism indicated generally at 81 is used to release both brakes 78 and 79.

Brakes 78 and 79 are identical in structure and operation. The following description is limited to brake 78 with the corresponding parts of brake 79 having the same reference numeral with the suffix A. As shown in FIGURE 6, brake 78 has a lever 82 located adjacent one side of the pulley 63. Pivots 83 mount one end of lever 82 to support 66 and frame 24 so that the midportion of the lever moves toward and away from the pulley 63. A brake shoe 84 attached to the midsection of lever 82 is engageable with the pulley 62.

As shown in FIGURE 7, pulley 63 has a downwardly extended flange providing an external braking surface or drum for the brake shoe 84. Immediately above the flange pulley 63 has a circumferential groove accommodating the belt 76.

The free or opposite end 86 of lever 82 is bifurcated with an elongated transverse control rod 87 extended through the slot in end 86 of lever 82. A coil spring 88 located between support 66 and lever 82 and positioned about rod 87 biases lever 82 toward the pulley 63 to the brake applying position. A washer 89 interposed between the spring and the lever provides a seat for the spring 88. A collar or stop 91 is secured to the shaft on the side of the lever 82 opposite spring 88. Collar 91 is spaced a small distance from the lever 82 when the brake is applied so as not to interfere with the biasing action of spring 88. To release the brake control rod 87 is moved to the left as shown in FIGURE 8 forcing the collar in engagement with the end of lever 82 thereby moving the lever 82 away from the pulley 63 to a brake release position. In the release position shoe 84 is spaced from pulley 63.

The control rod 82 is mounted for sliding longitudinal movement in the supports 64 and 66 which have aligned holes 93 and 94 respectively for accommodating the rod 87. Control mechanism 81 attached to the right end of rod 87 is operable to move the rod in a direction to simultaneously release both brake 78 and 79.

Control mechanism 81 comprises a lever 96 pivoted to the frame at pivot connection 97. Lever 96 extends generally transverse to the direction of rod 87 and has a hole 98 receiving the turned end 99 of rod 87 thereby pivotally connecting the rod to the lever. The lever 96 extends forwardly from the pivot connection 97 and has a forward projection 101 with a forwardly and inwardly inclining edge 102 with a longitudinal straight edge 103. The rearward extension of the lever extends adjacent the outside of the brake control of switch assembly 77. Mounted on the frame adjacent the inclined edge of the lever is a manually movable brake release member comprising a downwardly projected finger 104 pivoted to the frame for movement about a transverse axis of pivot projections 106. Extended in an opposite direction from finger 104 is an arm 107, shown in FIGURE 2, which functions as a main control arm for finger 104. As shown in FIGURE 8, when finger 104 is moved in a forward direction the forward portion 101 of lever 96 is moved toward pulley 63 forcing rod 87 in a direction of arrow 105 to release both brakes 78 and 79. Finger 104 rests on the straight edge 103 to hold the brakes 78 and 79 in their released positions thereby enabling an operator to manually move the film reels. The pressure of springs 88 and 88A force the lever into engagement with the finger 104 whereby the friction between the finger and the straight edge 103 prevents the finger from moving to its released position. On release of the pressure of lever 96 on finger 104, the finger will move under the influence of a light spring 108 to the release position, shown in FIGURE 4.

A roller 109 rotatably mounted on the rear end of lever 96 engages a non-circular cam 111 having a flat side 112. Cam 111 mounted on the control shaft 113 of switch assembly 77 operates in conjunction with the switch to release the brakes 78 and 79 and permit the springs 88 and 88A to apply the brakes 78 and 79 when the switch is in the off position.

The combination switch and brake control 77, shown in FIGURE 9, comprises a variable resistance switch unit indicated generally at 114 having a first resistance coil 116 and a second resistance coil 118 connected to the lines 119 and 121 respectively. A common contact 118 operatively connected to the shaft 113 rotates with the cam 111. Contact 118 selectively engages the ends of the coils 116 and 117 to affect a switching action to connect one of the motors 67 or 68 to the source of electric power. Contact 118 is in the off position between the coils when the flat side 112 of cam 111 is adjacent roller 109 so that the brakes will automatically and immediately be applied when the power to the motor is cut off. This prevents free rotation of the reels 17 and 18. A knob 122 secured to the upper end of shaft 113 is used to facilitate the concurrent operation of the switch with the brake control.

In use, referring to FIGURE 6 when the flat side 112 is adjacent the roller 109, the switch is in the off position and the brakes 78 and 79 are in the applied positions. The brakes may be released without operating the motors by movement of the arm 107 forcing the finger in a rearward direction, as shown in FIGURE 8, thereby moving the lever and rod 87 to a brake release position. The roller 109 moves away from the cam 111 and still remains a short distance within the circumferential arc of the circular portion of the cam. When the switch is turned to an on position, either to the left or to the right, the cam will engage the roller 109 rotating the lever 96 a slight distance to the brake release position. This releases the holding action established by the friction between the edge 103 and finger 104. With the force on the finger 104 release spring 108 returns the finger 104 to the brake release position. This automatically prevents the brakes 78 and 79 from being held in the release position when the switch is turned off. As soon as the switch is turned off the flat portion 112 of the cam aligns with the roller 109 thereby releasing the force on lever 96. Both springs 88 and 88A force the levers to the brake applied positions. The collars 91 and 91A being spaced slightly from the levers 82 and 82A when the brakes are in the applied positions do not interfere with the action of the springs 88 and 88A in applying the brakes.

While the invention has been described and illustrated with reference to a preferred embodiment, it is understood that various substitutions and changes in form may be made by those skilled in the art without departing from the spirit of the invention.

The embodiments of the invention in which an exclusive property or privilege is claimed are defined as follows:

1. In a reader for film having information: a frame, a projection screen pivotally mounted on said frame for selective movement to a first position adjacent the frame and to a second position extended upwardly from said frame, a movable cover located over said screen to enclose the screen when it is in the first position and to shield the screen from outside light when it is in the second position, means for projecting the image of the information on the film on the screen, said means including a mirror, linkage means pivotally connecting the mirror to the frame for movement to a first position and to a second position, means pivotally mounting the cover for movement to an open position and a closed position, said linkage means connected to said cover whereby the mirror moves from the first position to hte second position on movement of the cover from the open to the closed position.

2. The structure of claim 1 including side walls pivotallally mounted on opposite sides of the screen for movement to a rearward extended position when the screen is in the second position and to a folded position adjacent the back side of the screen when the screen is in the first position.

3. The structure of claim 1 wherein said linkage means comprise two pair of parallel links, each link pivotally connected at one end to the frame and pivotally connected at the opposite end to the mirror and link means connecting at least one of the links to the cover.

4. The structure of claim 3 wherein the link means comprise arms connected to one link of each pair of links, and means connecting the arms to the cover.

5. The structure of claim 1 wherein the cover is part of a carrying case for the entire reader, said frame being secured to the case.

6. The structure of claim 1 wherein the cover projects forwardly from the top of the screen to shade when the cover is in the second position.

7. In an optical reader for film having information: a frame, projection screen means pivotally mounted for selective movement to a first folded position and to a second upright position relative to the frame, a movable cover located over said frame and screen to enclose the screen when it is in the first position and to shield the screen from outside top light when it is in the second position, means for projecting the image of the information on the film on the screen, said projecting means including an upwardly extended mirror, linkage means pivotally connecting the mirror to the frame for movement to a first position and to a second position, means pivotally mounting the cover for movement to an open position and a closed position, said linkage means connected to said cover whereby the mirror moves from the first position to the second position on movement of the cover from the open to the closed position.

8. The structure of claim 7 wherein said linkage means comprise two pair of parallel links, each link pivotally connected at one end to the frame and pivotally connected at the opposite end to the mirror, and link means connecting at least one of the links to the cover.

9. The structure of claim 8 wherein the link means comprise arms connected to one link of each pair of links, and means connecting the arms to the cover.

10. In a reader for film having information: a frame, a support for the frame, a movable cover located over the said frame, means pivotally mounting the cover on the support for movement to an open position away from the frame and a closed position adjacent the frame, an upwardly extended mirror located below the cover, linkage means pivotally connecting the mirror to the frame for selective movement to a first position and to a second position, said linkage means including at least one member connected to said cover whereby the mirror moves from the first position to the second position on movement of the cover from the open position to the closed position.

11. The structure of claim 10 wherein said linkage means comprise two pair of parallel links, each link pivotally connected at one end to the frame and pivotally connected at the opposite end to the mirror, and said member connecting at least one of the links to the cover.

12. The structure of claim 11 wherein two members comprising arms are connected to one link of each pair of links, and means connect the arms to the cover.

13. The structure of claim 10 wherein the support is the base of a case enclosing the frame, mirror, and linkage means.

References Cited

UNITED STATES PATENTS

| 1,283,590 | 11/1918 | Stavenhagen. |
| 3,028,790 | 4/1962 | Wade et al. |
| 3,234,848 | 2/1966 | Stoothoff. |
| 3,381,120 | 4/1968 | Fleisher et al. _____ 240—4.2 |

FOREIGN PATENTS

| 380,968 | 9/1923 | Germany. |
| 804,047 | 4/1951 | Germany. |

NORTON ANSHER, Primary Examiner

ROGERT P. GREINER, Assistant Examiner

U.S. Cl. X.R.

353—98

PO-1050
(5/69)

UNITED STATES PATENT OFFICE
CERTIFICATE OF CORRECTION

Patent No. 3,479,116              Dated November 18, 1969

Inventor(s) KERMIT V. ANDERSON

It is certified that error appears in the above-identified patent and that said Letters Patent are hereby corrected as shown below:

Column 3, Line 58, cancel "agains" and insert --against--;

Column 5, Line 2, before "with" insert --joined--;

Column 6, Line 20, cancel "hte" and insert --the--;

Column 6, Lines 23 and 24, cancel "pivotallally" and insert --pivotally--;

Column 6, Line 42, after "shade" insert --the screen--.

SIGNED AND
SEALED
MAY 26 1970

(SEAL)
Attest:

Edward M. Fletcher, Jr.
Attesting Officer

WILLIAM E. SCHUYLER, JR.
Commissioner of Patents